United States Patent [19]

Liesveld

[11] Patent Number: 5,428,542
[45] Date of Patent: Jun. 27, 1995

[54] VEHICLE MILEAGE AND INFORMATION RECORDING METHOD AND SYSTEM

[76] Inventor: Aura L. Liesveld, 2333 S. Yarrow Way, Lakewood, Colo. 80227

[21] Appl. No.: 190,739

[22] Filed: Feb. 2, 1994

Related U.S. Application Data

[63] Continuation of Ser. No. 725,968, Jul. 5, 1991.

[51] Int. Cl.6 .................................................. G06F 7/70
[52] U.S. Cl. ............................ 364/424.04; 364/424.03; 364/424.01; 364/444; 364/449; 340/990; 340/995; 381/43; 381/46
[58] Field of Search ..................... 364/424.03, 424.04, 364/424.01, 406, 408, 709.02, 709.01, 709.04, 449, 443, 444, 424.02, 436, 454, 424.05; 360/12; 340/990, 995, 988; 381/43, 46

[56] References Cited

U.S. PATENT DOCUMENTS

| | | | |
|---|---|---|---|
| 3,792,445 | 2/1974 | Bucks et al. | 340/172.5 |
| 4,067,061 | 1/1978 | Juhasz | 364/900 |
| 4,101,742 | 7/1978 | Craig et al. | 179/100.1 C |
| 4,159,490 | 6/1979 | Wood | 360/12 |
| 4,190,819 | 2/1980 | Burgyan | 340/23 |
| 4,192,006 | 3/1980 | Hausdorff | 364/715 |
| 4,258,421 | 3/1981 | Juhasz et al. | 364/424.04 |
| 4,277,837 | 7/1981 | Stuckert | 364/704 |
| 4,334,248 | 6/1982 | Maiocco | 360/12 |
| 4,502,123 | 2/1985 | Minami et al. | 364/449 |
| 4,630,209 | 12/1986 | Saito et al. | 364/444 |
| 4,644,368 | 2/1987 | Mutz | 346/33 |
| 4,677,429 | 6/1987 | Glotzbach | 340/711 |
| 4,679,147 | 7/1987 | Tsujii et al. | 364/449 |
| 4,685,061 | 8/1987 | Whitaker | 364/561 |
| 4,758,959 | 7/1988 | Thoone et al. | 364/454 |
| 4,835,546 | 5/1989 | Keller | 346/33 |
| 4,852,000 | 7/1989 | Webb et al. | 364/406 |
| 4,853,856 | 8/1989 | Hanway | 364/424.01 |
| 4,858,133 | 8/1989 | Takeuchi et al. | 364/424.04 |
| 4,882,696 | 11/1989 | Nimura et al. | 364/444 |
| 4,933,852 | 6/1990 | Lemelson | 364/424.03 |
| 4,954,958 | 9/1990 | Savage et al. | 364/444 |
| 5,021,952 | 6/1991 | Nishimura et al. | 364/406 |
| 5,041,983 | 8/1991 | Nakahara et al. | 364/449 |
| 5,046,007 | 9/1991 | McCrery et al. | 364/424.04 |
| 5,170,164 | 12/1992 | Lewis | 340/988 |
| 5,177,685 | 1/1993 | Davis et al. | 364/443 |
| 5,267,159 | 11/1993 | O'Neall | 364/424.04 |
| 5,274,560 | 12/1993 | LaRue | 364/444 |

*Primary Examiner*—Kevin J. Teska
*Assistant Examiner*—Jacques H. Louis-Jacques
*Attorney, Agent, or Firm*—John E. Reilly

[57] ABSTRACT

A unique method and system has been devised for recording information relating to the distance traveled of a vehicle for tax-reporting purposes in which a tape player unit contains one or more prerecorded messages relating to mileage, destination, etc. and a tape recorder unit is synchronized with the taper player unit to record the answers given by the vehicle driver to the information requested in the first series of messages at the beginning of a trip; and when the destination is reached and the vehicle is turned off, the tape player and tape recorder units are activated once again to play prerecorded second messages relating to actual mileage or distance traveled and then to record the answer or answers given by the driver of the vehicle to the second series of messages.

19 Claims, 2 Drawing Sheets

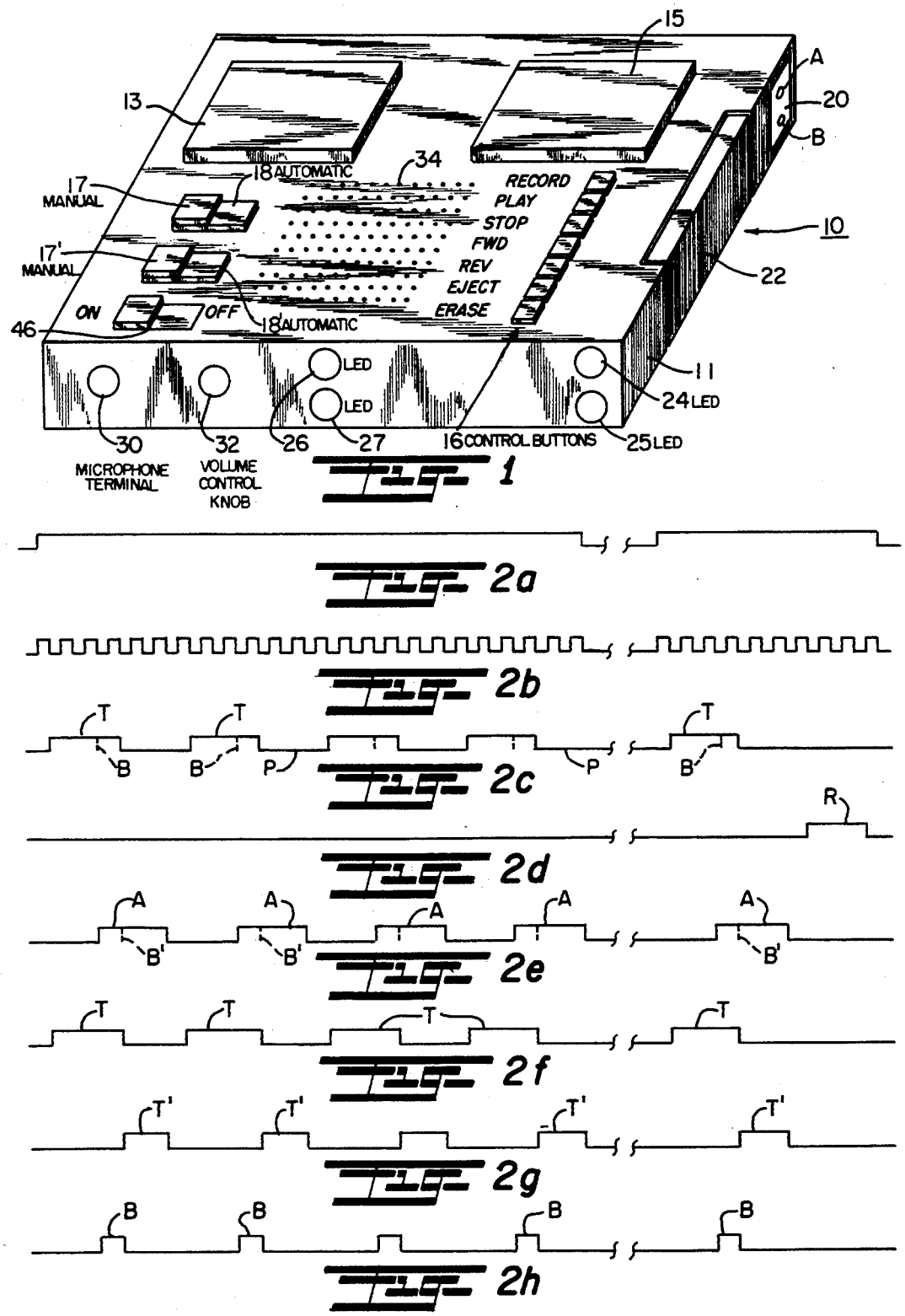

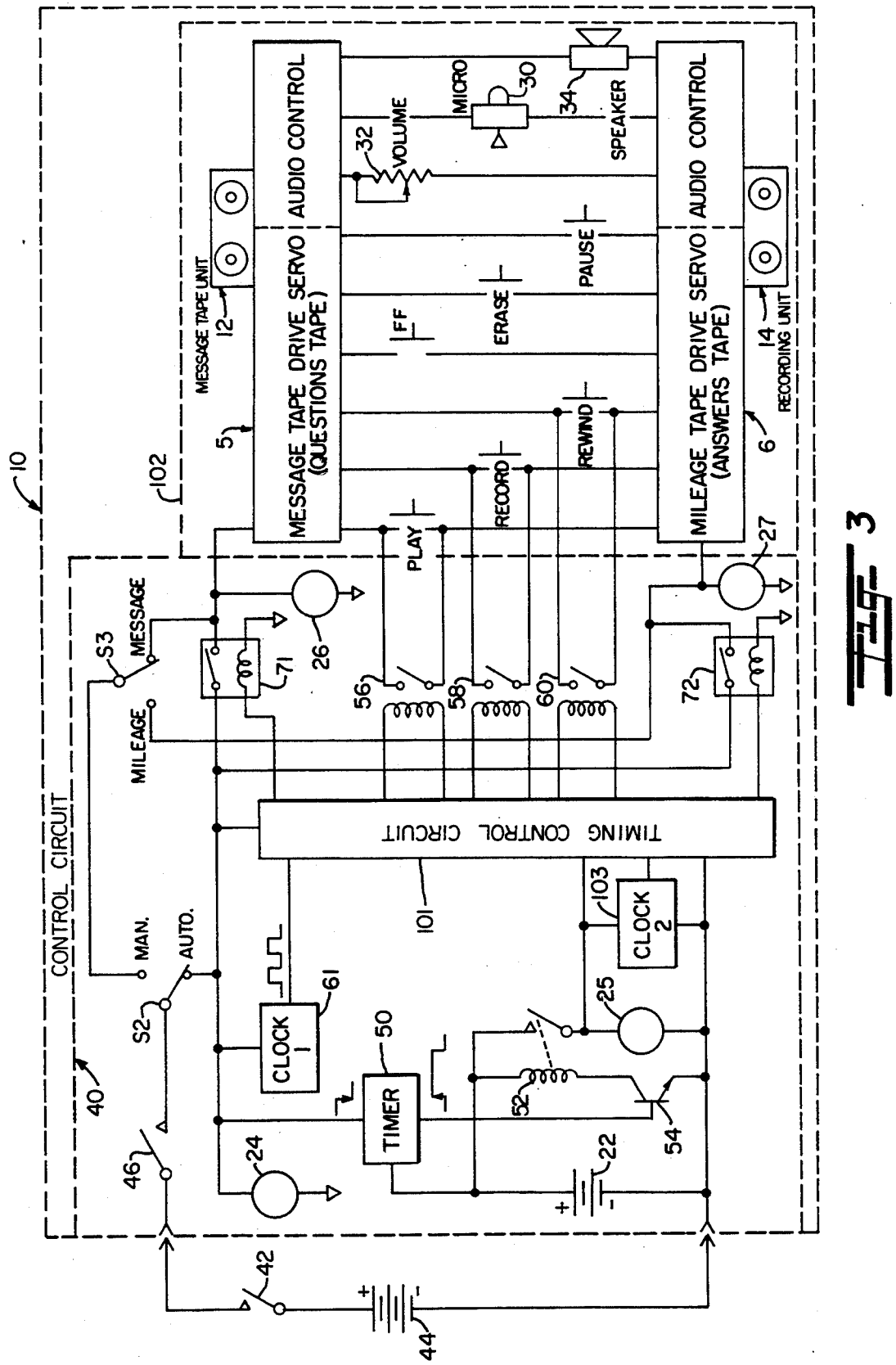

VEHICLE MILEAGE AND INFORMATION RECORDING METHOD AND SYSTEM

CROSS-REFERENCE TO RELATED APPLICATIONS

This application is a file wrapper continuation application of Ser. No. 725,968, filed 5 Jul. 1994, now abandoned, for VEHICLE MILEAGE AND INFORMATION RECORDING METHOD AND SYSTEM, invented by Aura Liesveld.

This invention relates to information recording systems; and more particularly relates to a novel and improved method and apparatus for recording information relating to distance traveled and other operational information for a vehicle for tax-reporting purposes.

BACKGROUND AND FIELD OF THE INVENTION

Recent changes in the tax laws have placed a premium on keeping accurate records of car mileage for business purposes in order to properly support a taxable deduction for business use of the car. As a minimum, such record-keeping should include destination, mileage or distance traveled, nature or purpose of the trip as well as date when trip was made. People who have to keep such records either forget, or are in a hurry and do not make the effort or expend the time to write such information down after each trip. As a result, when income tax time comes they lack the proper records to support a tax deduction and have either forgotten most of the details and are forced to guess at or to make up records. Their records are therefore inaccurate, incomplete and very likely would not support their claim for a deduction if audited.

It is therefore proposed as a solution to the foregoing problem to devise a system which will prompt the vehicle operator at the beginning and end of each trip to record the necessary information relating to that trip for tax purposes, and which further provides an easy and convenient means for accurately recording such information at the beginning and end of each trip. Preferably, this is carried out without the use of sophisticated or expensive equipment and obviates the time-consuming task of writing down mileage information before and after each trip. In this relation, it is desirable that the prompts or information to be recorded be done by means of pre-recorded messages, the message player being automatically activated at the beginning and end of each trip or journey; and further that the information recorded is synchronized with the message prompter to record the operator's verbal responses to the information requested.

In the past, systems which have been devised for recording vehicle mileage or other information have required that the vehicle operator remember to operate the recorder and does not automatically respond to starting and stopping of the vehicle to prompt the operator to record the necessary information. Moreover, systems of the type devised in the past have been fairly sophisticated requiring use of microprocessors with computer programs as well as the use of the keyboard to be manually operated, and representative patents are U.S. Pat. Nos. 4,677,429 to R. W. Glotzbach, 4,685,061 to C. D. Whitaker and 4,834,546 to W. L. Keller. Other patents of general interest in this field are U.S. Pat. Nos. 3,792,445 to R. M. Bucks et al, 4,067,061 to J. E. Juhasz, 4,334,248 to N. P. Maiocco, 4,644,368 to G. Mutz, 4,853,856 to J. R. Hanway, 4,858,133 to K. Takeuchi et al and 4,933,852 to J. H. Lemelson.

SUMMARY OF THE INVENTION

It is therefore an object of the present invention to provide for a novel and improved method and means for keeping records on vehicle mileage or other information which is highly dependable, efficient and time-saving in use while affording an accurate, convenient means for recording information by the operator of a vehicle.

It is another object of the present invention to provide for a novel and improved system for recording information relating to mileage or distance traveled of a vehicle which includes a novel and improved means for prompting the operator at the beginning and end of each trip to record the necessary mileage information for tax-reporting purposes; and further wherein a novel and improved means is provided for recording verbal responses of the vehicle operator to the information requested.

It is a further object of the present invention to provide for an on-board, automatic mileage recorder system for a vehicle which is versatile, easy to use and permits recording of vital information without distracting the operator from his normal driving duties.

In accordance with the present invention, a novel and improved method has been devised for recording information relating to the distance traveled of a vehicle and which includes the steps of providing one or more pre-recorded messages relating to standard mileage and intended destination and playing same in response to a first signal generated when the vehicle is started, providing an information recorder to record information supplied by an occupant of the vehicle in response to the information requested in the messages, and followed by providing one or more additional prerecorded messages played in response to a second signal generated when the vehicle is stopped to request information relating to final mileage and activating the information recorder again to permit the occupant of the vehicle to record the information requested.

In a preferred system according to the present invention, there is provided in combination a message-containing play unit, record means for recording information dictated by an occupant of the vehicle, first activating means which responds to starting of the vehicle to activate the play unit to broadcast first messages contained thereon relating to mileage and intended destination, second activating means which responds to starting of the vehicle to activate the record means to record information dictated by the occupant of the vehicle in answer to the first messages, third activating means for activating the play unit in response to turning off the vehicle to play a prerecorded second message relating to mileage or distance traveled, and fourth activating means for activating the record means to record information dictated by an occupant of the vehicle in answer to the information requested in the second message. Preferably, the play unit and record means are combined into a single tape player and tape recorder unit and which contains rewind means for automatically rewinding the player unit to the beginning of the first series of messages after the second series of messages has been played.

The above and other objects, advantages and features of the present invention will become more readily appreciated and understood when taken together with the following detailed description of a preferred embodiment of the present invention in conjunction with the accompanying drawings, in which:

BRIEF DESCRIPTION OF THE DRAWINGS

FIG. 1 is an isometric view of a preferred form of automatic mileage recorder system for a vehicle, in accordance with the present invention;

FIGS. 2a to 2h are timing diagrams of the preferred form of recording system of FIG. 1 when in operation and illustrating the synchronization between different components of the recording system when in operation; and FIG. 3 is block diagram of the control circuit for the preferred :form of automatic mileage recorder system of the present invention.

DETAILED DESCRIPTION OF PREFERRED EMBODIMENT

Referring in more detail to the drawings, there is shown by way of illustrative example in FIG. 1 a recorder system 10 installed within a generally rectangular housing 11 which is designed for installation into a front console or dashboard panel of a motor vehicle, such as, an automobile.

Referring to FIGS. 1 and 3, the system 10 comprises a message tape unit 12 suitably housed in a compartment 13 for playing pre-recorded messages contained on the unit 12. A recording unit 14 in a compartment 15 is provided for recording answers or responses to the prompts or questions contained in the messages played by the unit 12. A series of manual control buttons 16 are provided on the front panel of the housing 11 for manual operation of the system 10 and appropriately include "play", "stop", "record", "forward", "reverse", "eject" and "erase". In addition, "manual" and "automatic" buttons 17 and 18, are provided for manual and automatic operation of the system 10, respectively. When in the "manual" mode, both the message tape unit 12 and the mileage tape unit 14 can be operated individually depending upon the position of switch $S_3$ in the "mileage" or "message" position. A terminal 20 is provided for connection to the ignition and ground of the automobile, and the system 10 operates using both the car's battery 44 at the beginning of a trip and its own internal battery in compartment 22 at the end of the trip in a manner to be described in more detail in conjunction with the control circuit of FIG. 3. To this end the front side of the housing 11 includes appropriate display lights including an LED 24 to indicate usage of the car battery and LED 25 to indicate usage of the self-contained batteries. LEDs 26 and 27 are provided to indicate when the message tape unit 12 and record tape unit 14, respectively, are in operation. A microphone terminal 30 is provided at one end of the housing together with a volume control knob 32. "ON" and "OFF" buttons 46 are illustrated in the upper panel of the housing, and a speaker is represented at 34. In the setting as described, the system 10 may be a conventional telephone answering machine, such as, Model 1080, manufactured and sold by Code-A-Phone of Oregon and which is adapted for use in a manner to be described in conjunction with FIG. 3 as a mileage recorder, in accordance with the present invention.

As further shown in FIG. 3, an important feature of the present invention resides in a control circuit 40 which serves as an interface between ignition switch 42 of the automobile and the tape units 12 and 14. The ignition switch 42 is connected in series to the car battery as represented at 44 and to an ON/OFF switch 46. When the ignition switch 42 is turned on, the ON/OFF switch is in the ON position and the "AUTOMATIC" button 18 is depressed to advance switch $S_2$ to the automatic position, DC power is supplied to the system 10. A MESSAGE/MILEAGE switch 48 can be in either position, and the power ON/OFF light 24 should be on when the ignition switch 42 is turned on. DC voltage is supplied automatically to the message tape servo drive 5 in order to power the message tape 12, or to the mileage tape servo drive 6 in order to power the mileage tape 14. Thus, when the message tape unit 12 is energized by relay coil 71, it is advanced in a forward direction by relay 56 and can be rewound by relay 60 in a manner to be described. The record unit 14 is energized by relay 72 and played in the record mode by energization of relay coil 58.

A general description of the operation of the control circuit will be helpful to an understanding of the method and apparatus of the present invention: The system 10 is specifically adapted for use in recording or logging data in connection with distance traveled or mileage for business-related or tax deduction purposes. To this end, the message tape unit 12 when activated will prompt or ask questions of the driver or other occupant of the vehicle. In turn, the recording unit 14 when activated will permit recording of the answers to the questions asked. Each time that the ignition key is turned on to result in closure of switch 42, the message tape unit 12 is activated to ask the driver to state the mileage of the car, destination, date of the day, time of day, etc. there being a space or lull between each question asked to permit the driver to record the answer by speaking into the microphone thereby recording the questions and the answers on the tape unit 14.

When the destination is reached and the ignition key is turned off, the message tape unit 12 is once again activated to ask for the final mileage. The driver can state the mileage or odometer reading, the record tape unit 14 will then be deactivated and the message tape unit 12 will rewind automatically back to the beginning of the message sequence for the next operation.

More specifically, in the circuit operation, when the ignition switch 42 is closed, power is supplied to the timing control circuit 101, as a result of which indicator light 24 is turned on and clock 61 starts running. The timing control circuit 101 will energize the relays 71 and 56 to activate the message tape 12 to ask the driver for the starting mileage of the car, and the light 26 will be turned on during this operation. The timing control circuit 101 then energizes the relays 72 and 58 to activate the mileage tape 14 whereupon the driver can read aloud into the microphone 30 the starting mileage of the car and thereafter sequentially proceed through any further questions and answers. After the initial questions and answers are completed, the timing control circuit 101 is temporarily interrupted until the journey is completed or the car's ignition switch 42 is turned off. When the ignition is turned off at the end of the journey, the timing control circuit 101 receives its power from its own internal battery 22. A single pulse timer 50 is enabled by a negative-going signal that is created when the car's power is turned off and will remain enabled for a predetermined period of time necessary to complete any additional questions and answers at the end of the journey. In this sequence, relay 52 is energized by the timer 50 by closing transistor switch 54, and power is applied to the clock 103 to start the second sequence of questions and answers. Once again, the relays 71 and 56 are energized to activate the message tape 12 to ask the driver for the final mileage; the mileage tape servo 6 is then activated by energizing relays 72 and 58 so that the driver can record the final mileage. When all of the questions and answers are completed, relays 60 and 71 are activated and the message tape 12 is rewound to its original position after which the timer 50 resets, relay 52 opens and power is removed from the timing control circuit 101 until the ignition switch is turned on for the next operation. The timing control circuit 101 as described, is preferably made up of a binary counter Part SN 54159 which activates a decoder demultiplexer Part SN 54SL93 in response to the signal from clock 61 when the clock 61 starts running and which typically would occur when the ignition switch 42 is closed at the beginning of the trip. Thereafter, when the ignition switch 42 is turned off, a second binary counter and decoder demultiplexer in the timing control circuit 101 is activated when the clock 103 starts running to start the second sequence of questions and answers. Each of the decoder demultiplexers operates in a well known manner to sequentially activate or deliver the series of questions at spaced intervals by activating the relays 56, 71, 58 and and 72.

An understanding of the operation and coordination between events under the control of the control circuit 40 also can be gained from a consideration of the timing diagrams FIGS. 2a to 2h in relation to the circuitry shown in FIG. 3. It will be assumed that the initial conditions are: ON/OFF switch 46 is closed and the ignition switch 42 open and that the contacts of relays 71, 72, 56, 58 and 60 are in their normally open position. When the driver turns on the ignition to close the switch 42, as represented in FIG. 2a, the clock 61, FIG. 2b, starts a sequence of events within 24 to 36 counts or a time period of one to two minutes, depending upon the preference of the driver. Initially, this power is supplied through the relay coils 56 and 71 to activate the message tape unit 12 in the play mode; and through the speaker 34 the driver will hear the initial message request for starting mileage. As represented at FIG. 2c the tape unit will deliver a message during the time intervals as designated at T, separated by pause intervals P to permit the driver to respond to the message. Each message concludes with a bip or audible tone as designated at B at the end of each message interval to indicate to the driver that the machine is ready to accept his response.

FIG. 2e illustrates the time intervals A which are synchronized at the end of each message interval T for recording the driver's response or answer to each message. Preferably each recording interval is synchronized by the counter to be initiated by energizing the relay 58 slightly ahead of the end of the message interval, or at the beginning of the bip interval B within each message interval so that the recording unit 14 is up to speed by the end of the complete message interval P.

FIGS. 2f and 2g merely designate time intervals T and T' for activation of the message tape/speaker and record tape/microphone in each recording sequence. FIG. 2h represents the bipactivated intervals also shown in FIG. 2c.

It should be noted that the message tape relays 56 and 71 and record tape relays 58 and 72 are deenergized at the end of the initial count period of the clock 61 or, in other words, when the clock 61 times out at the end of the initial 24 to 36 counts as illustrated in FIG. 2b and this will occur after the initial series of prompts when the ignition key is turned on and the driver is asked for information pertaining to mileage, destination, date and time of day. When the destination is reached and the ignition key is turned off the timer control circuit 101 is activated as described, and the transistor switch 54 energizes the coil of relay 52 which allows power to be delivered from the internal battery or power source to the entire circuit via relay 52. As represented in FIG. 2b the second series of counts from 1 to 10 will enable the power from the battery 22 to maintain operation of the units 12 and 14 for an additional time interval necessary for prompting the driver to record the final mileage reading.

FIG. 2d represents the automatic reversal sequence for rewinding the message tape and which will occur at R after the last message interval T.

After the counter times out, the control circuit 40 will turn off and be in a ready condition or state to begin a new cycle when the ignition switch is turned on again. Of course, the control circuit 40 can be turned off any time that the driver does not wish to record mileage for a particular journey simply by turning off the switch 46. If the driver stops the car and leaves before reaching a given destination, it is not necessary to record anything but merely to ignore the questions from the message tape unit. When the driver returns to continue the journey, the message tape is once again ignored. Again if the purpose of the trip is not for business, the driver can ignore all questions from the message tape or turn the system off. The information on the record tape unit 14 for each trip occupies very little space on the tape and therefore records can be accumulated over long term intervals without removal or replacement of the tape. At any time, the information from the tape unit 14 can be transferred to a written record then the tape erased, rewound and used again. Of course, the record tape unit 14 can also be employed for dictation or recording of other information and which either may be combined on the same record tape or another record tape substituted in the system 10 so that one record tape is used exclusively for recording mileage.

It will be evident from the foregoing that various message/recording systems may be employed with the control circuit of the present invention. The size of the system 10 should be such that it can be mounted in the interior of an automobile, such as, a center console, dashboard or interior of the roof without obstructing the driver's view and remaining within reach of the driver. Only two connecting points are required to the car; namely, to the ignition switch and to the negative terminal of the car battery. In the system 10, the message tape and mileage tape can be operated in the manual or the automatic mode depending upon the position of switch $S_2$. If the switch $S_2$ is in the manual position and the switch $S_3$ is in the message position, the message tape can be operated as in a regular recorder. Similarly, if the switch $S_2$ is in the manual position and the switch $S_3$ is in the mileage position, the mileage tape can be operated as in a standard recorder.

It is therefore to be understood that the above and other modifications and changes may be made to the construction and arrangement of parts comprising the system of the present invention as well as the sequence of steps comprising the method of the present invention without departing from the spirit and scope thereof as defined by the appended claims and any reasonable equivalents thereof.

I claim:

1. The method of recording information relating to the distance traveled of a vehicle having an ignition switch to start the vehicle, comprising the steps of:
   generating a first signal automatically in response to turning on the vehicle ignition switch;
   broadcasting one or more pre-recorded audible messages and playing same in response to the first signal generated when the vehicle is started, said pre-recorded audible messages requesting information relating to starting mileage and intended destination;
   providing an information recorder to record information verbally supplied by an occupant of the vehicle in response to the information requested in said audible messages;
   generating a second signal automatically in response to stopping the vehicle by turning off the vehicle ignition switch; and
   providing one or more pre-recorded audible messages and playing same in response to the second signal generated when the vehicle is stopped to request information relating to final mileage, and activating said information recorder to permit the occupant of the vehicle to record the information verbally supplied by the occupant in response to the final mileage information requested.

2. The method according to claim 1, including the step of playing said final mileage pre-recorded messages a predetermined time interval after the vehicle is stopped.

3. The method according to claim 1, said information recorder being deactivated a predetermined time interval after said ignition switch is turned on.

4. The method according to claim 3, including the step of activating said information recorder a limited time interval after said ignition switch is turned off for a time interval sufficient for the occupant of the vehicle to verbally supply the information requested relating to final mileage.

5. The method according to claim 1, including the step of manually activating said information recorder for recording information other than that requested in said pre-recorded messages.

6. The method according to claim 1, including the step of generating an audible tone at the end of each message followed by a pause between messages for a time period sufficient to permit the occupant of the vehicle to record the information requested in each message.

7. The method for recording information relating to destination and distance traveled of a vehicle which is provided by an occupant of the vehicle for tax reporting purposes, comprising the steps of:
   providing a series of pre-recorded audible messages and activating same over spaced time intervals automatically in response to turning on the vehicle ignition, said pre-recorded messages relating to starting mileage as reflected on the vehicle odometer, intended destination, etc.;
   providing an information recorder and activating same in order to record information verbally supplied by the occupant in response to the information requested in said messages relating to the starting mileage, destination, etc.; and followed by automatically playing a pre-recorded message each time that the ignition is turned off for a time period sufficient to request information relating to final mileage, and once again activating said information recorder for a time period sufficient to record the information verbally supplied by the occupant in response to the final mileage information requested.

8. The method according to claim 7, including the step of deactivating said information recorder between the information requested between said series of pre-recorded messages and said pre-recorded message relating to final mileage.

9. The method according to claim 8, including the step of repeating said series of pre-recorded messages each time that the vehicle is turned on, and repeating said pre-recorded message relating to final mileage each time that the vehicle is turned off.

10. A system for recording information on distance and destination of a vehicle for tax-reporting purposes wherein an ignition switch is provided for starting and stopping said vehicle, comprising:
    an audible message-containing play unit;
    record means for recording information verbally dictated by an occupant of said vehicle;
    first activating means automatically responsive to turning on said ignition switch in starting said vehicle to activate said play unit to broadcast first audible messages contained thereon relating to mileage, destination, etc.;
    second activating means automatically responsive to turning on said ignition switch in starting said vehicle to activate said record means to record the information verbally dictated by an occupant of the vehicle in answer to said first messages;
    third activating means for activating said play unit in response to turning off said ignition switch to play a pre-recorded second audible message relating to mileage or distance traveled; and
    fourth activating means for activating said record means to record information verbally dictated by an occupant of the vehicle in response to the information requested in the second audible message by said play unit.

11. A system according to claim 10, including deactivating means for deactivating said play unit a selected time interval after said vehicle is started.

12. A system according to claim 10, said first activating means including relay means energized in response to closing of said ignition switch to supply power to said play unit.

13. A system according to claim 12, said vehicle including a standard battery for operating said vehicle, and means connecting said ignition switch to said battery.

14. A system according to claim 10, said second activating means including relay means energized in response to power supplied by said first activating means.

15. A system according to claim 10, said third activating means including clock circuit means for regulating the time interval over which power is supplied from said vehicle battery to said playing unit and said record means.

16. A system according to claim 15, said clock circuit means being energized in response to turning off said ignition to supply power both to said play unit and said record means for a predetermined time interval after said vehicle ignition switch is turned off.

17. A system according to claim 16, said fourth activating means activated in response to activation of said clock circuit means when said ignition switch is turned off.

18. A system for selectively recording information on distance and destination of a vehicle when used for business purposes wherein an ignition switch is provided for starting and stopping said vehicle, comprising:

a message-containing tape player unit connected to said ignition switch;

tape recorder means connected to said tape player for recording information verbally dictated by the driver of the vehicle;

first activating means automatically responsive to starting said vehicle to activate said player unit to broadcast a first series of audible messages contained thereon relating to mileage, destination, etc.;

second activating means responsive to starting of said vehicle to activate said recorder unit after each said audible message of said first series is broadcast to record information verbally dictated by the driver of the vehicle in response to each said audible message;

deactivating means for deactivating said player unit and said recorder unit a selected time interval after the last of said first series is played;

third activating means for activating said player unit in response to turning off said vehicle to broadcast a second series of audible messages relating to mileage or distance traveled;

fourth activating means for activating said recorder unit to record information verbally dictated by the driver of the vehicle in answer to broadcasting each message of said second series; and rewind means for automatically rewinding said player unit to the beginning of said first series after said second series has been broadcast.

19. A system according to claim 18, said first activating means connected to supply DC power from a vehicle battery to activate said player unit to play said first series of messages, and said third activating means including a second battery for activating said player unit in response to turning off said vehicle to play said second series of messages.

* * * * *